(12) United States Patent
Eadie

(10) Patent No.: US 8,070,757 B2
(45) Date of Patent: Dec. 6, 2011

(54) QUICK-RELEASE TAG APPLICATOR

(75) Inventor: Brian Eadie, Philiphaugh (GB)

(73) Assignee: Allflex Europe (UK) Limited, London (GB)

( * ) Notice: Subject to any disclaimer, the term of this patent is extended or adjusted under 35 U.S.C. 154(b) by 202 days.

(21) Appl. No.: 12/440,109

(22) PCT Filed: Sep. 28, 2007

(86) PCT No.: PCT/EP2007/060336
§ 371 (c)(1),
(2), (4) Date: May 1, 2009

(87) PCT Pub. No.: WO2008/037802
PCT Pub. Date: Apr. 3, 2008

(65) Prior Publication Data
US 2009/0270878 A1    Oct. 29, 2009

(30) Foreign Application Priority Data
Sep. 29, 2006   (GB) .................................. 0619206.6

(51) Int. Cl.
*A61B 17/00* (2006.01)
(52) U.S. Cl. ...................................................... 606/117
(58) Field of Classification Search ................. 606/116, 606/117, 181, 182, 185, 188, 205, 209; 227/26, 227/31, 32, 132, 134, 147; 119/655, 858, 119/866; 81/342, 355, 361
See application file for complete search history.

(56) References Cited

U.S. PATENT DOCUMENTS
4,943,294 A * 7/1990 Knapp ........................... 606/117
5,234,440 A * 8/1993 Cohr ............................. 606/117

FOREIGN PATENT DOCUMENTS
EP   0055127    6/1982
WO   0172117    10/2001
WO   0223980    3/2002

OTHER PUBLICATIONS
International Search Report dated Feb. 29, 2008, in PCT application.

* cited by examiner

*Primary Examiner* — Ryan Severson
*Assistant Examiner* — Jonathan W Miles
(74) *Attorney, Agent, or Firm* — Young & Thompson

(57) ABSTRACT

An identification tag applicator is provided, which is especially suited to applying identification tags to animals. The applicator includes a body (12) which has a driving rod housing (20) in which a driving rod (24) is slidably engaged. The driving rod (24) has a driving surface (28) adapted to receive a tag (60) which is to be applied. The applicator also has a trigger member (14) which is pivotably attached to the body (12). The trigger member (14) includes a connecting pin (46) which is adapted to selectively engage the trigger member (14) with the driving rod (24). A release mechanism automatically returns the driving rod (24) to a retracted position when the driving surface (28) of the rod (24) reaches a predetermined distance from the housing (20). The release mechanism ensures that the driving rod (24) is immediately retracted out of the way as soon as the tag is applied.

9 Claims, 3 Drawing Sheets

QUICK-RELEASE TAG APPLICATOR

The present invention is directed to applicators for applying tags to articles. The invention is particularly suitable for use in applying identification tags to animals, although it is not limited to this particular application.

Tag applicators, whether for one-piece or two-piece tags, conventionally have a driving member which drives the point of the tag through an article such that the tag is fixed to the article. These driving members are usually elongate members which are pushed towards the article via a hand-operated trigger mechanism. A tag is loaded onto the end of the driving member, ready for application. The trigger mechanism may be spring-loaded, so that the trigger and the driving member will move back to their starting positions once the trigger is released by an operator.

In certain applications this arrangement is not ideal. For example, where a tag is to be applied to a garment, the garment may be damaged if the operator tries to remove the garment from the applicator before the driving member has returned to its starting position. With the tag on the end of the driving member, it is possible to snag the garment when moving the applicator if the tag and driving member are still in contact. Unless the operator has fully released the trigger, the driving member could still be in contact with the tag.

The same problem occurs when applying identification tags to animals. This application also has the added problem that the animal will likely be trying to escape from the operator during the tag application. This doubles the risk of damage to the animal, with the animal's own movement and the movement of the applicator being possible causes if the operator has not fully released the trigger after the tag application.

It is an aim of the present invention to obviate or mitigate this disadvantage of existing applicators.

According to the present invention, there is provided an identification tag applicator, comprising:
a body comprising a housing;
a driving rod slidably engaged with the housing, the rod having a driving surface adapted to receive a tag; and
a trigger member pivotably attached to the body, wherein the trigger member includes a connecting pin adapted to selectively engage with the driving rod; and
the applicator further comprising a release mechanism adapted to automatically return the driving rod to a retracted position when the driving surface of the rod reaches a predetermined distance from the housing.

Preferably, the release mechanism comprises:
a first biasing means biasing the driving rod towards the retracted position;
a second biasing means biasing the connecting pin into engagement with the driving rod; and
a cam surface on the housing, the cam surface adapted to move the connecting pin out of engagement with the driving rod when the driving surface reaches the predetermined distance.

Preferably, the driving rod has a first end remote from the driving surface, and the first biasing means is a compression spring located between the housing and the first end of the driving rod.

Preferably, the applicator further comprises a third biasing means connected between the body and the trigger member, the third biasing means biasing the trigger member into a rest position.

Preferably, the body further comprises a clamping member adapted to clamp a portion of a tag. The clamping member is preferably biased into a clamping position by a fourth biasing means. Preferably, the fourth biasing means is a torsion spring.

An embodiment of the present invention will now be described, by way of example only, with reference to the accompanying drawings, in which.

Figure 1:
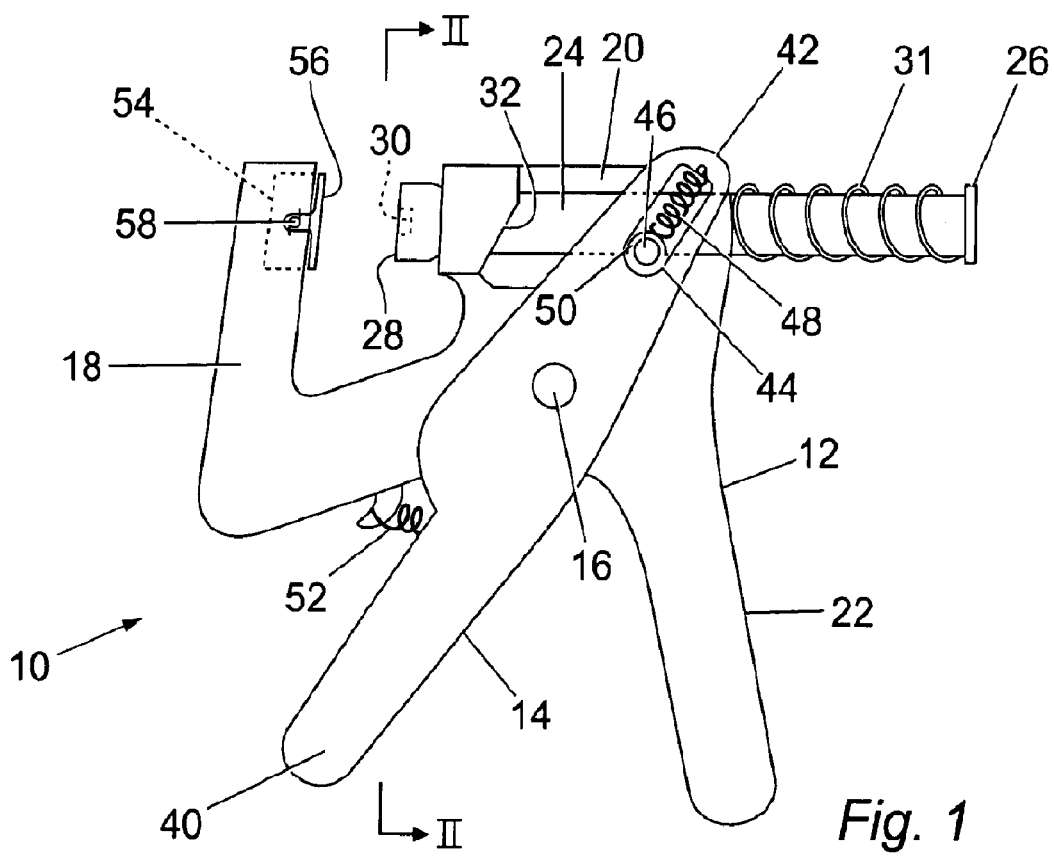
FIG. 1 is a side view of a tag applicator in accordance with the present invention.
Figure 2:
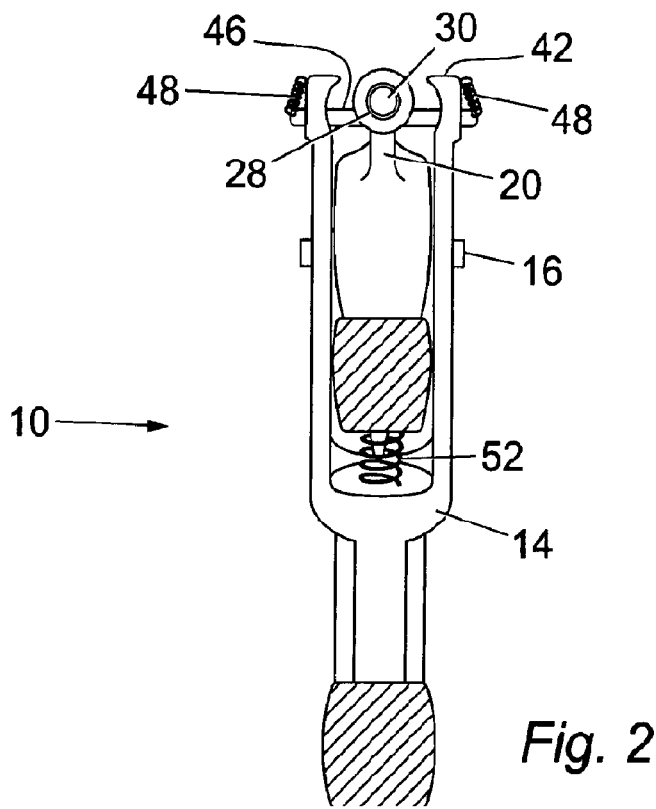
FIG. 2 is a section view of the applicator taken along line II-II shown in FIG. 1.

FIGS. 1 and 2 show a tag applicator, generally designated 10, which comprises a body 12 and a trigger member 14. The trigger member 14 is pivotably attached to the body via a pivot pin 16. The body 10 is preferably formed in a single piece and includes a clamp portion 18, a housing portion 20, and a handle portion 22. The clamp portion 18 and housing portion 20 are arranged such that the body 12 has a generally U-shaped profile, with an opening formed between the clamp portion 18 and housing portion 20.

Slidingly located in the housing portion 20 is a driving rod 24. The driving rod 24 has a first end spaced from the applicator 10, where there is provided a flange 26. The second end of the rod 24 has a driving surface 28 which is adapted to receive a portion of a tag (not shown in FIG. 1). The driving surface 28 includes a tag recess 30 into which a portion of a tag can be snap-fitted, as will be explained below. A biasing means, preferably in the form of a compression spring 31, is provided on the driving rod 24, and is compressed between the flange 26 and the outer end of the housing 20.

On the inner end of the housing 20 adjacent the opening, there is provided a cam surface 32. The cam surface 32 slopes downwards in the direction of the opening.

The trigger 14 comprises a grip end 40 and a driving end 42. Adjacent the driving end 42 is an elongate slot 44 which extends through the trigger 14. Located in the slot 44 is a connecting pin 46 which is fixed to the trigger by a pair of biasing means, preferably in the form of extension springs 48. This arrangement allows the pin 46 to move longitudinally within the slot 44, but with the pin biased by the springs 48 towards the end of the slot 44 remote from the grip end 40. The driving rod 24 includes a groove 50 on the underside thereof, in which the connecting pin 46 is ordinarily located. When the pin 46 is located in the groove 50, pivotal movement of the trigger 40 imparts a linear movement on the driving rod 24.

Another biasing means, again preferably an extension spring 52, is connected between the body 12 and the trigger 14. This spring biases the trigger 14 into the rest position shown in FIG. 1.

The clamp portion 18 is provided with a recess 54 which faces the driving surface 28 of the driving rod 24. In use, the recess 54 will receive the point of a tag as it is pushed through an article. This ensures that the point of the tag successfully passes through the article being tagged. Optionally, a clamp member 56 can be located over the recess 54. The clamp member 56 can be biased in a clamped position by a biasing means, preferably a torsion spring 58.

The clamp member 56 is preferably used when two-piece tags are being applied by the applicator. The clamp member 56 will hold the female part of the tag, into which the driving rod 24 will drive the point of the male part of the tag during application.

FIGS. 3(a)-(d) show detail views of the release mechanism formed by the housing 20, driving rod 24 and springs 31,48.

The base of a tag 60 is held in the tag recess 30 of the driving rod 24 by a snap-fit connection.

Figure 3A:
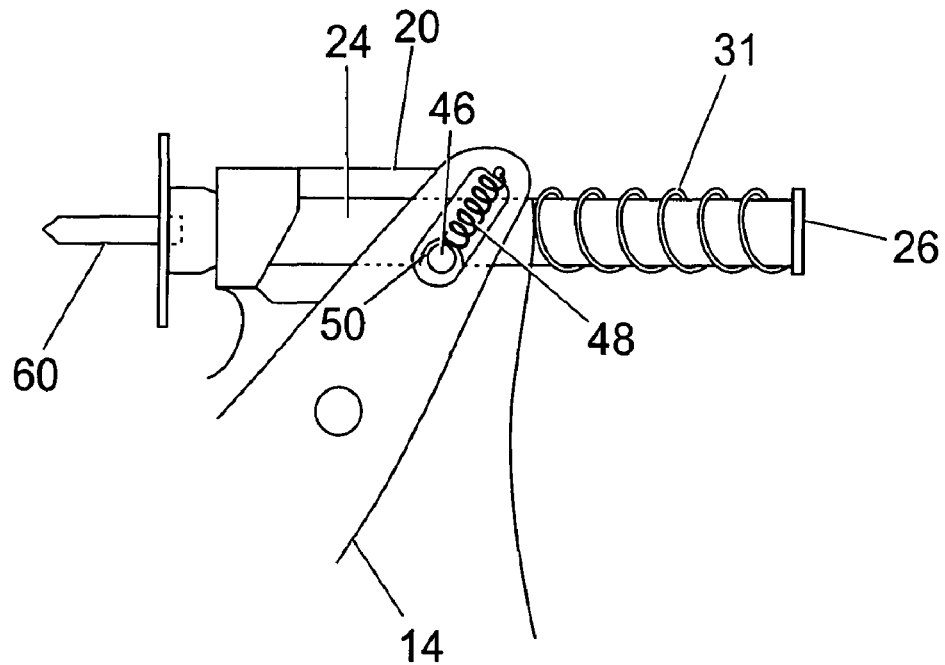
FIGS. 3(a)-(d) are detail views showing the operation of a release mechanism of the applicator when in use.

FIG. 3(a) shows the applicator when the driving rod 24 is in the retracted, or rest, position. Compression spring 31 is acting between the end of the housing 20 and the flange 26 on the end of the driving rod 24 to hold the driving rod 24 in the retracted position. The connecting pin 46 of the trigger 14 is held in the groove 50 in the driving rod 24 by the pair of extension springs 48.

Figure 3B:
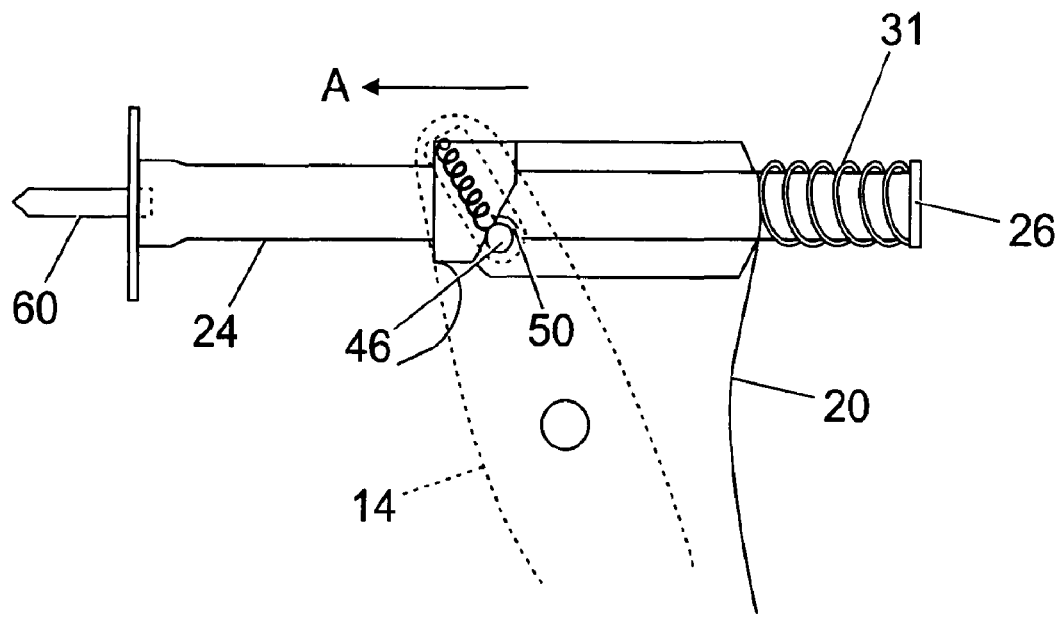
Figure 3C:
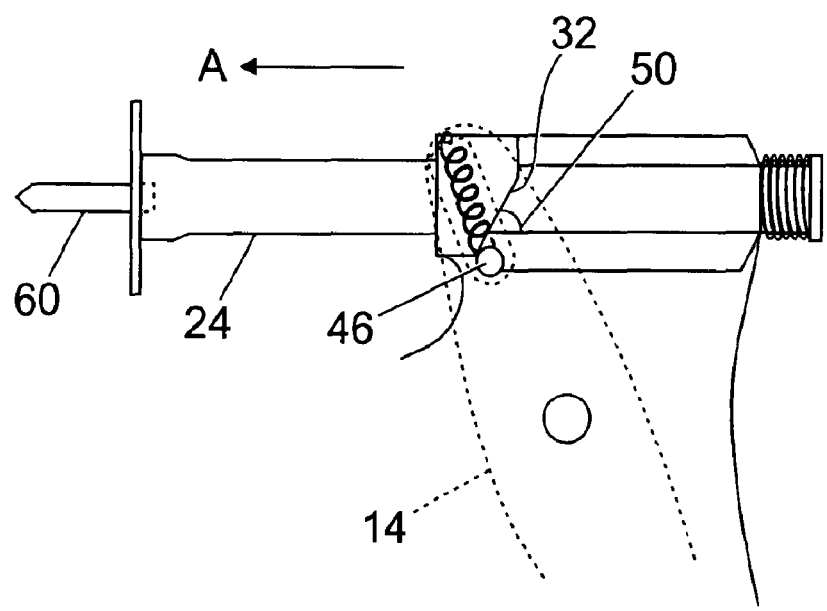
Figure 3D:
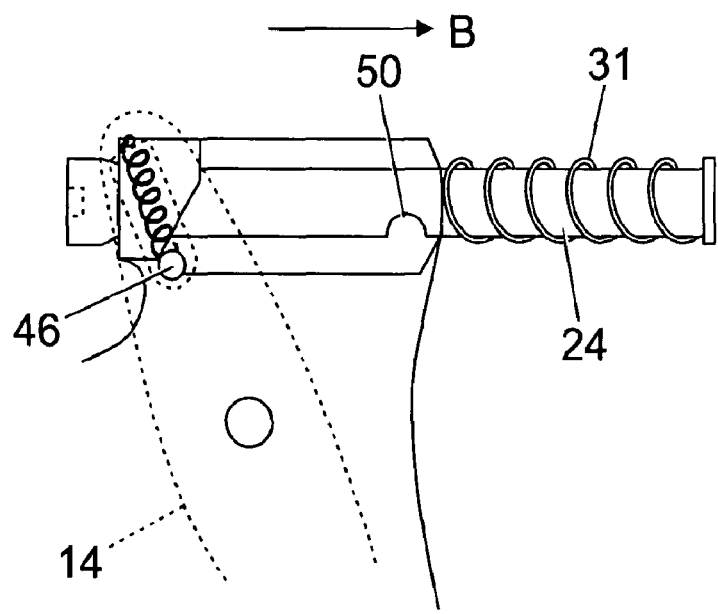

FIGS. 3(b)-(d) show the trigger 14 in dotted lines for illustrative purposes. Referring specifically to FIG. 3(b), this shows the applicator when the trigger 14 is being pulled. As the trigger 14 is pulled back towards the handle portion of the applicator body, the connecting pin 46 and groove 50 act to translate the pivoting motion of the trigger 14 into a linear motion of the driving rod 24 in the direction of arrow A. As the driving rod 24 moves in the direction A, the compression spring 31 compresses between the end of the housing 20 and the driving rod end flange 26.

FIG. 3(c) shows the applicator just as the driving rod is almost at the farthest extent of its travel in direction A. This corresponds with the point where the tag 60 has pierced the article to which it is being applied. As the trigger 14 has continued to pivot, the connecting pin 46 and driving rod 24 have continued to move in direction A. The connecting pin 46 has now come into contact with the downwardly sloping cam surface 32 on the housing 20. Consequently, as the driving rod 24 continues in direction A, the connecting pin 46 rides down the cam surface 32 and is therefore forced from the groove 50 in the driving rod 24.

The instant that the connecting pin 46 leaves the groove 50, the connection between the trigger and driving rod has been removed. Consequently, there is no longer any force from the trigger 14 resisting the bias of the compression spring 31. As a result, as shown in FIG. 3(d), the driving rod 24 is instantaneously propelled back to its retracted position by the compression spring 31 in the direction shown by arrow B. During this motion of the driving rod 24, the tag 60 will disconnect from the tag recess 30 and remain attached to the article. A new tag can then be connected to the driving rod and the application procedure repeated.

Thanks to the release mechanism of the present invention, inadvertent damage to articles can be avoided. With the driving rod quickly and automatically moved back to a retracted position, there is no reliance on the operator quickly releasing the trigger. There is also nothing holding the applied tag in the opening in the applicator body following application. As a result, the operator of the applicator can move the applicator away from the article without fear of tearing the article because the tag is still held in place by the driving rod. This is especially advantageous in agricultural applications such as, for example, applying identification tags to the ears of animals. Naturally, animals are reluctant to be held by an operator whilst the tag is being applied. As a result, they will struggle to get away at the earliest opportunity. Understandably, the animals are even more difficult to control once the tag has been applied through the ear. With conventional applicators, there is always a danger that the animal's ear will tear if the operator does not release the trigger quickly enough before the animal struggles free. With the present invention, there is no need for the operator to release the trigger immediately, as the release mechanism has already retracted the driving rod independently of the trigger.

Similarly, damage to garments due to clumsy handling of the applicator will also be avoided thanks to the release mechanism. If an operator of a conventional applicator is in too much of a hurry, they may try to move away from the tagged garment before the trigger has been released and the tag disconnected from the driving rod. With the driving rod consequently still deployed, this movement could lead to the tag tearing the garment. Again, by instantly retracting the driving rod, the tag is no longer held by the applicator and the operator can freely move away from the garment.

In the illustrated embodiment, extension spring 52 and compression spring 31 combine to bias the trigger 14 and driving rod 24 into their rest positions. However, it will be appreciated that the applicator would still operate as a quick-release applicator if only the compression spring 31 is present. The trigger 14 could be returned to its rest position by hand, but it remains preferable to have the extension spring 52 biasing the trigger 14 towards the rest position for ease of use.

Although the illustrated embodiment relies on a snap-fit connection to hold the tag to the driving surface of the driving rod, it should be understood that alternative connections may be equally suitable. For example, a friction fit between the tag and recess would also operate in the desired manner, i.e. allowing the driving rod to hold the tag whilst still ensuring that the tag and driving rod parted company when the driving rod was released.

These and other modifications may be incorporated without departing from the scope of the invention.

The invention claimed is:

1. An identification tag applicator comprising:
a body comprising a driving rod housing;
a driving rod slidably engaged with the housing, the rod having a groove and a driving surface adapted to receive a tag;
a trigger member pivotably attached to the body, wherein the trigger member includes a cylindrical connecting pin adapted to selectively engage the trigger member with the driving rod and a slot adapted to accept the cylindrical connecting pin;
a release mechanism adapted to automatically return the driving rod to a retracted position when the driving surface of the rod reaches a predetermined distance from the housing;
a first biasing means biasing the driving rod toward the retracted position;
a second biasing means biasing the cylindrical connecting pin into engage with the driving rod; and
a cam surface on the housing, the cam surface adapted to move the cylindrical connecting pin out of engagement with the driving rod when the driving surface reaches the predetermined distance from the housing,
wherein the cam surface moves the cylindrical connecting pin in the slot away from the driving rod and out of engagement with the groove.

2. The applicator of claim 1, wherein the driving rod has a first end remote from the driving surface, and the first biasing means is a compression spring located between the housing and the first end of the driving rod.

3. The applicator of claim 2, further comprising a third biasing means connected between the body and the trigger member, the third biasing means biasing the trigger member into a rest position.

4. The applicator of claim 2, wherein the body further comprises a clamping member adapted to clamp a portion of a tag which is to be applied.

5. The applicator of claim 1, further comprising a third biasing means connected between the body and the trigger member, the third biasing means biasing the trigger member into a rest position.

6. The applicator of claim 1, wherein the body further comprises a clamping member adapted to clamp a portion of a tag which is to be applied.

7. The applicator of claim 6, wherein the clamping member is biased into a clamping position by a fourth biasing means.

8. The applicator of claim 7, wherein the fourth biasing means is a torsion spring.

9. The applicator of claim 1, wherein the cylindrical connecting pin being horizontally oriented along its central axis.

* * * * *